(12) United States Patent
Luten

(10) Patent No.: US 8,088,440 B2
(45) Date of Patent: Jan. 3, 2012

(54) HYDROPHOBIC COATING INCLUDING UNDERLAYER(S) DEPOSITED VIA FLAME PYROLYSIS

(75) Inventor: Henry A. Luten, Ypsilanti, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1209 days.

(21) Appl. No.: 10/996,066

(22) Filed: Nov. 24, 2004

(65) Prior Publication Data
US 2006/0110606 A1 May 25, 2006

(51) Int. Cl.
*C23C 16/00* (2006.01)
(52) U.S. Cl. ............ 427/248.1; 427/432; 427/446
(58) Field of Classification Search .......... 427/248.1, 427/432, 446
See application file for complete search history.

(56) References Cited

U.S. PATENT DOCUMENTS

| | | | |
|---|---|---|---|
| 3,883,336 A | 5/1975 | Randall | |
| 4,600,390 A | 7/1986 | Göbel et al. | |
| 4,620,988 A | 11/1986 | Garschke et al. | |
| 5,110,335 A * | 5/1992 | Miller et al. | 65/425 |
| 5,652,021 A * | 7/1997 | Hunt et al. | 427/248.1 |
| 5,800,918 A | 9/1998 | Chartier et al. | |
| 5,958,361 A | 9/1999 | Laine et al. | |
| 6,261,693 B1 | 7/2001 | Veerasamy | |
| 6,284,377 B1 | 9/2001 | Veerasamy | |
| 6,303,225 B1 | 10/2001 | Veerasamy | |
| 6,312,131 B1 * | 11/2001 | Yamamoto et al. | 359/507 |
| 6,312,808 B1 | 11/2001 | Veerasamy et al. | |
| 6,338,901 B1 * | 1/2002 | Veerasamy | 428/408 |
| 6,387,346 B1 | 5/2002 | Bertsch-Frank et al. | |
| 6,395,333 B2 | 5/2002 | Veerasamy | |
| 6,638,570 B2 | 10/2003 | Veerasamy | |
| 6,689,476 B2 | 2/2004 | Veerasamy et al. | |
| 6,692,832 B2 | 2/2004 | Murphy | |
| 6,743,516 B2 | 6/2004 | Murphy et al. | |
| 6,818,309 B1 * | 11/2004 | Talpaert et al. | 428/432 |
| 7,445,273 B2 * | 11/2008 | Veerasamy et al. | 296/190.1 |
| 7,455,883 B2 * | 11/2008 | Petrmichl et al. | 427/224 |
| 2002/0064663 A1 * | 5/2002 | Murphy et al. | 428/447 |
| 2002/0157420 A1 * | 10/2002 | Hrdina et al. | 65/17.4 |
| 2003/0180544 A1 * | 9/2003 | Murphy | 428/428 |
| 2006/0083853 A1 * | 4/2006 | Petrmichl et al. | 427/224 |

FOREIGN PATENT DOCUMENTS
EP 0594171 A1 * 10/1993
* cited by examiner

*Primary Examiner* — Shamim Ahmed
(74) *Attorney, Agent, or Firm* — Nixon & Vanderhye P.C.

(57) ABSTRACT

A coated article is provided with a coating including at least one underlayer and a hydrophobic layer over at least the underlayer. The hydrophobic layer may have properties such as high contact angle θ. Hydrophobic properties of a multi-layer coating may be improved by depositing the underlayer(s) using flame pyrolysis.

20 Claims, 2 Drawing Sheets

HYDROPHOBIC COATING INCLUDING UNDERLAYER(S) DEPOSITED VIA FLAME PYROLYSIS

This invention relates to a coated article including an underlayer(s) of a dielectric material. In certain example embodiments, the underlayer(s) may be deposited via flame pyrolysis. It has been found that the deposition of the underlayer(s) via flame pyrolysis improves hydrophobic qualities of certain layers formed thereover.

BACKGROUND OF THE INVENTION

Hydrophobic coatings are known in the art. The typical strategy for creating a hydrophobic coating having a high contact angle θ is to coat a substrate with a material having a surface energy (or surface tension) that is greatly dissimilar to water.

While certain materials have hydrophobic properties, there is room for improvement in certain respects.

Thus, according to certain example embodiments of this invention, a technique is provided which may improve hydrophobic qualities of a coated article.

BRIEF SUMMARY OF EXAMPLE EMBODIMENTS OF THE INVENTION

In certain example embodiments of this invention, a coated article is provided with a coating including at least one underlayer and a hydrophobic layer over at least the underlayer. The hydrophobic layer may have properties such as high contact angle θ.

Surprisingly, it has been found that hydrophobic properties of a multi-layer coating may be improved by depositing the underlayer using flame pyrolysis. In particular, the hydrophobic properties can be improved when the underlayer is deposited via flame pyrolysis compared to if it is deposited in another manner such as magnetron sputtering.

Thus, in certain example embodiments of this invention, an underlayer is formed on a substrate (either directly or indirectly) using a flame pyrolysis deposition technique (or combustion CVD). Then, a hydrophobic layer is formed on the substrate over the flame-pyrolysis deposited layer. The presence of the flame-pyrolysis deposited layers has been found to improve the hydrophobic properties of the coated article.

In certain example embodiments of this invention, there is provided a method of making a coated article including a hydrophobic coating, the method comprising providing a glass substrate; using flame pyrolysis to deposit a layer on the glass substrate; and forming a hydrophobic layer on the substrate over at least the layer deposited by flame pyrolysis.

In other example embodiments of this invention, there is provided a method of making a coated article including a hydrophobic coating, the method comprising providing a substrate; using flame pyrolysis to deposit a layer comprising $SiO_2$ on the substrate, wherein the flame pyrolysis comprises introducing a gas and/or liquid comprising Si into a flame of at least one burner in forming the layer comprising $SiO_2$; and forming a hydrophobic layer on the substrate over the layer comprising $SiO_2$ deposited by flame pyrolysis.

In certain other example embodiments of this invention, there is provided a coated article comprising a glass substrate; a flame pyrolysis deposited layer comprising silicon oxide on the substrate; and a hydrophobic layer on the substrate over at least the flame pyrolysis deposited layer comprising silicon oxide

DETAILED DESCRIPTION OF EXAMPLE EMBODIMENTS OF THE INVENTION

In certain embodiments of this invention, improvement of the hydrophobic nature of a coated article is achieved by utilizing a surface (exterior and/or interior surface) having roughness such as defined by peaks and/or valleys. The formation or provision of nanostructures or other roughness on the surface results in an exterior surface of the coated article having both segments of solid material and segments of voids or air. Because liquids have high contact angles θ in air (e.g., water's contact angle θ in air approaches 180 degrees), the provision of the voids at the surface of the coated article due to the nanostructures allows the coated article to exhibit increased and/or high contact angles θ, and thus be hydrophobic in nature. The nanostructures may be randomly or uniformly positioned in different embodiments.

In certain example embodiments of this invention, a coated article is provided with a coating including at least one underlayer and a hydrophobic layer over at least the underlayer. The hydrophobic layer may have properties such as high contact angles θ. Surprisingly, it has been found that hydrophobic properties of a multi-layer coating may be improved by depositing the underlayer using flame pyrolysis. In particular, the hydrophobic properties can be improved when the underlayer is deposited via flame pyrolysis compared to if it is deposited in another manner such as magnetron sputtering. It has been found that an underlayer (e.g., a layer of or including silicon oxide) deposited by flame pyrolysis has a greater degree of surface roughness than a layer of the same material deposited in a different manner such as via magnetron sputtering. This increased surface roughness caused by the flame pyrolysis deposition technique helps improve the hydrophobic nature of certain materials that can be deposited on the substrate over the flame-pyrolysis deposited underlayer.

Moreover, in certain example embodiments, the silicon oxide (e.g., silicon dioxide) layer under the hydrophobic layer can provide increased adhesion or bonding density, thereby allowing the hydrophobic layer to be better bonded to the underlying glass substrate. The silicon oxide layer underlayer can also serve the purpose of preventing or reducing sodium migration which can be detrimental to the performance of some hydrophobic coatings.

Figure 1:
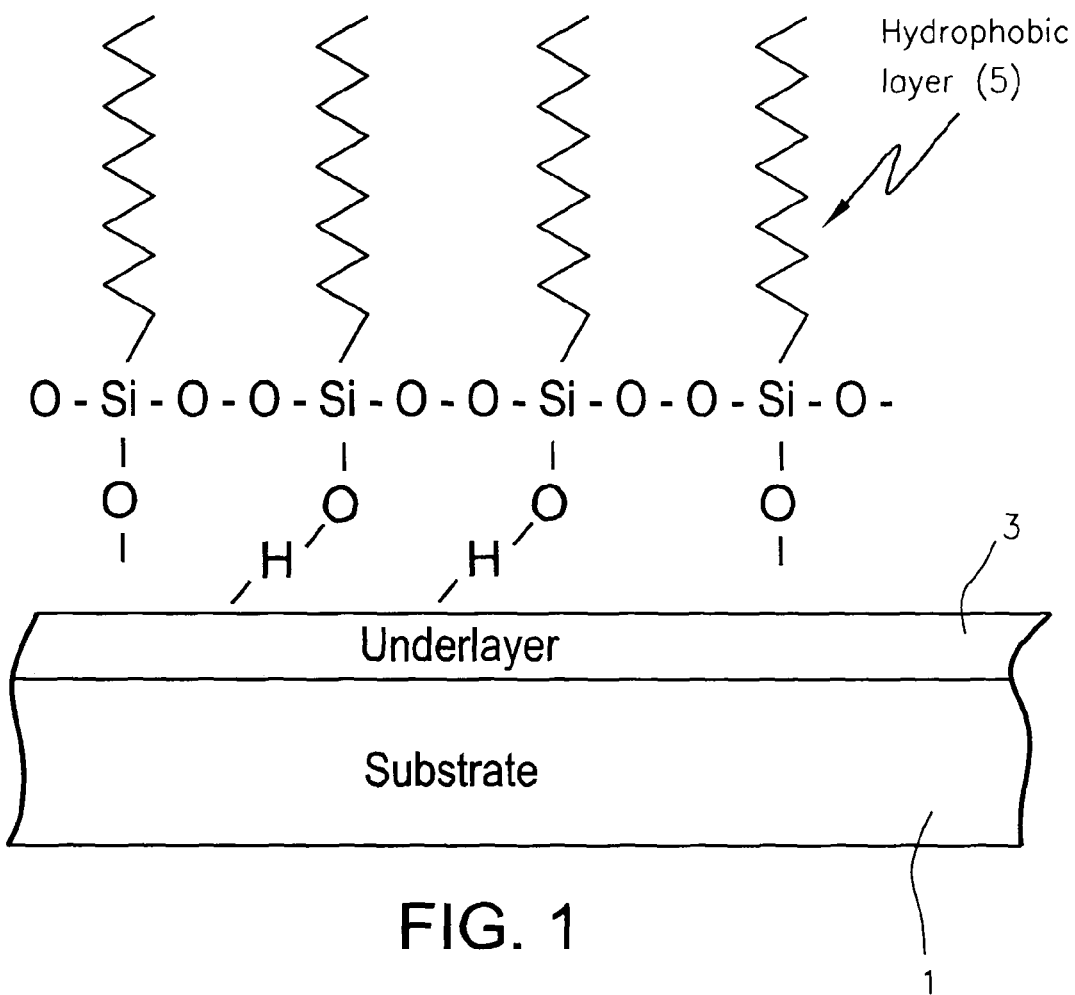
FIG. 1 is a cross sectional view of a coated article according to an example embodiment of this invention.
Figure 2:
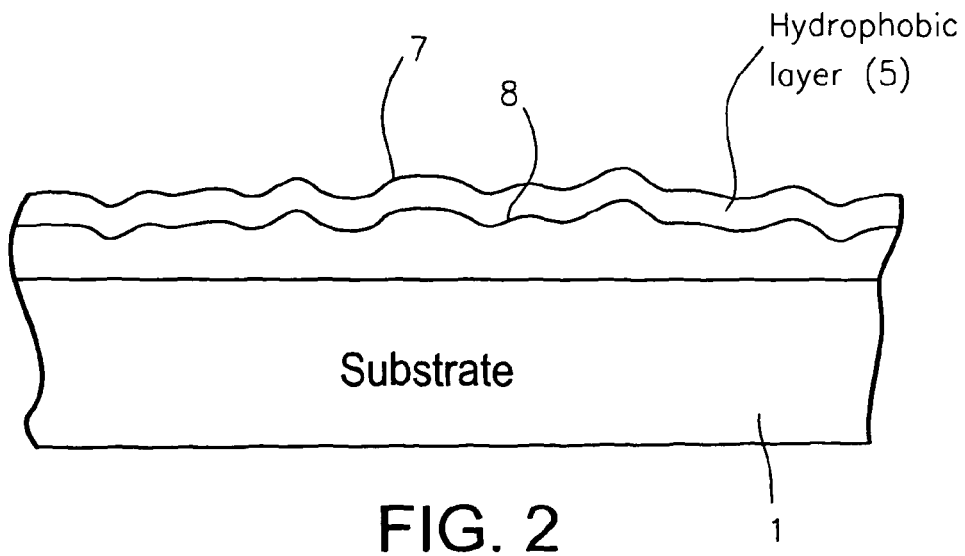
FIG. 2 is a close-up cross sectional view of part of a coated article according to an example embodiment of this invention.

FIGS. 1-2 illustrate an example hydrophobic coated article according to an example embodiment of this invention. The coated article includes at least one underlayer 3 which is flame-pyrolysis deposited on a substrate such as glass or the like. Then, and hydrophobic layer 5 is formed on the substrate 1 over at least the flame-pyrolysis deposited underlayer 3. In certain example embodiments of this invention, the underlayer 3 which is flame-pyrolysis deposited has a thickness of at least about 1,000 Å, more preferably at least about 1,500 Å (e.g., from aboutn 1,500 to 5,000 Å). In certain example embodiments of this invention, the hydrophobic layer 5 has a thickness of from about 100 to 2,000 Å, more preferably from about 500 to 1,500 Å (e.g., about 1,000 Å). In certain example embodiments, the hydrophobic layer 5 has a thickness less than that of the underlayer 3.

Typically, the strategy for creating a hydrophobic coating (high contact angle θ) involves coating a substrate 1 such as glass with a material 5 that has a surface energy (or surface tension) that is greatly dissimilar to water. It is known that $\gamma_1$, the surface free energy of water, is 73 mJ/m$^2$ and $\gamma_s$-HC, the surface free energy of a hydrocarbon (—CH$_2$—) chain, is 25 mJ/m$^2$ while, $\gamma_s$-FC, the surface free energy of a fluorocarbon (—CF$_2$—) chain, is 19 mJ/m$^2$. In alternative example embodiments of this invention, hydrocarbon and/or fluorocarbon coatings hydrophobic layers may be used and deposited on a substrate to form a hydrophobic layer 5.

For example, two example molecular precursors, namely: (a) 1H,1H,2H,2H-perfluorodecyltrichlorosilane (FTS) —CF$_3$(CF$_2$)$_8$CH$_2$CH$_2$SiCl$_3$ and (b) octadecyltrichlorosilane (ODS) —CH$_3$(CH$_2$)$_{17}$SiCl$_3$ may be used to form the hydrophobic layer 5 in certain example embodiments of this invention. In certain example embodiments precursor (a) may be used, while in other example embodiments precursor (b) may be used to form the hydrophobic layer. The fluorocarbon offers a slightly higher contact angle θ in certain instances as well as contact angle maintenance during humid UV exposure, while the hydrocarbon offers superior mechanical robustness in certain instances. The chemistry of both materials is believed to be the same when deposited onto glass under the certain conditions. It is generally believed that the chlorosilane is hydrolyzed with water that is added to the solution and/or resides on the surface of the glass or other layer: (hydrolysis) R—SiCl$_3$+H$_2$O→R—SiCl$_2$OH+HCl.

The product of this reaction can further hydrolyze to yield R—SiOH$_2$, which can hydrogen bond with the surface (physisorption) or directly react with a surface hydroxyl group (chemisorption). Alternately, the hydrolysis can occur via reaction with a surface hydroxyl group, in which case there is a chemical bond formed with the surface of the glass or underlayer: (surface hydrolysis) R—SiCl$_3$+HO-surface→R—SiCl$_2$O-surface+HCl. Regardless of the exact chemical nature of the surface bound species, addition molecules align themselves with the bound species (driven by van der Walls interactions, primarily) and cross link to that species via a condensation reaction, which forms a Si—O—Si network. Eventually, island of these self aligned monolayers (SAM) are formed. The islands eventually merge to create contiguous SAM film or layer 5, as illustrated in FIG. 1.

Depending on deposition conditions, additional growth can occur on top of the SAM. Complicated bilayer and vesicle structures (lamellar layer, micelles and inverse micelles) can form and attach to the same.

As explained above, it has been found that contact angle θ varies with the microstructure of the surface. Young's equation applies strictly to smooth surfaces. Microscopically rough surfaces obey a modified Young's equation: cos θ$_r$=r cos θ where is the ratio of the actual surface area to the geometric surface area and θ$_r$ is the apparent contact angles θ. Hydrophobicity can be achieve from hydrophobic coatings via introduction of roughness.

According to certain example embodiments of this invention, roughness and a concomitant increase in contact angle θ can be provided to hydrophobic layer 5 by depositing an underlayer(s) 3 using flame pyrolysis prior to SAM growth in layer 5. In particular, as shown in FIG. 2, the use of flame pyrolysis (or combustion CVD) to form underlayer(s) 3 causes the underlayer to have a greater surface roughness than it may otherwise have in certain example embodiments of this invention. Thus, when the hydrophobic layer 5 is formed over the underlayer 3 in a substantially conformal and/or uniform manner so as to also have a surface roughness, the contact angle θ of the layer 5 can be increased due to the presence of the flame pyrolysis deposited underlayer(s) 3.

In certain example embodiments of this invention, the coating has a contact angle θ of at least about 60 degrees, more preferably of at least about 70 degrees, still more preferably of at least about 80 degrees, even more preferably of at least about 90 degrees, and most preferably of at least about 100 degrees. This contact angle may be an initial contact angle upon formation of the coating, or alternatively may occur subsequent to the formation of the coating. This contact angle may be temporary depending on the environment. In certain example instances, the coating has a contact angle ever after 300 Taber abrasion cycles of at least about 65 degrees, more preferably of at least about 70 degrees. Moreover, coatings according to certain example embodiments of this invention may have a tilt angle (30 μL droplet size for reference purposes) of about 35 degrees or less, more preferably 30 degrees or less, and possibly 25 or 20 degrees or less.

In certain example embodiments of this invention, flame pyrolysis is used to deposit a layer of or including silicon oxide (e.g., SiO$_2$) as an underlayer 3. For example, a silane gas such as TEOS may be fed into at least one burner in order to cause a layer of silicon oxide 3 to be deposited on a glass substrate 1 at atmospheric pressure. Alternatively, the flame pyrolysis may utilize a liquid and/or gas including Si or other desirable material being fed into a flame of at least one burner. Examples of flame pyrolysis are disclosed in, for example and without limitation, U.S. Pat. Nos. 3,883,336, 4,600,390, 4,620,988, 5,652,021, 5,958,361, and 6,387,346, the disclosures of all of which are hereby incorporated herein by reference.

While silicon oxide is a preferred material for layer 3 in certain example embodiments of this invention, this invention is not so limited as other materials may instead be used. For purposes of example and without limitation, layer 3 may instead be of or include tungsten oxide, a nitride, or the like. It is noted that additional layer(s) may be provided between substrate 1 and layer 3 in certain alternative embodiments of this invention. In certain example embodiments of this invention, the flame pyrolysis deposited layer 3 may have an index of refraction (n) of from about 1.4 to 1.6.

Moreover, while hydrophobic layer 5 may be vapor or otherwise deposited using a fluorocarbon and/or hydrocarbon precursor in certain example embodiments of this invention, this invention is not so limited as other materials may instead be used for the hydrophobic layer. For example, diamond-like carbon (DLC) described in any of U.S. Pat. Nos. 6,284,377, 6,638,570, 6,395,333, or 6,338,901 (all hereby incorporated herein by reference) may be used for hydrophobic layer 5 in certain alternative embodiments of this invention. As another example, any of the hydrophobic layers described in any of U.S. Pat. Nos. 6,692,832, 6,743,516, 4,263,350, 4,274,856, 5,665,424, 5,723,172, 5,328,768, or 5,372,851 (all hereby incorporated herein by reference) may be used for hydrophobic layer 5 in certain example embodiments of this invention. For example, when an example layer of either U.S. Pat. No. 6,692,832 or 6,743,516 is used for the hydrophobic layer 5, a vapor deposition of an alkylsilane such as chloroalkylsilane (e.g., dimethyldichlorosilane, trimethylchlorosilane, methyltrichlorosilane, or the like) may be performed in order to form the hydrophobic layer 5. In certain example embodiments, a silane represented by the formula $Cl_xSiR_y$ may be used, where x is at least 14, y is at least 1, and R is an alkyl or alkyl group which may also be an oleophillic group, e.g., fluorinated alkyl. Other materials may also be used.

In certain example embodiments of this invention, a coated article is provided which has a surface including roughness such that the average height or elevation "d" (i.e., "d" is measured from the bottom of a valley to the top of an adjacent peak) is from about 5 to 60 nm, more preferably from about 10-30 nm. Moreover, in certain example embodiments a coated article is provided with a surface including nanostructures dimensioned such that the average lateral spacing or gap "g" between adjacent nanostructures (i.e., "g" is measured from the peak of one nanostructure to the peak of an adjacent nanostructure) is from about 10-100 nm, more preferably from about 10-50 nm. The aforesaid surface(s) may be: (i) an exterior surface of the coated article, and/or (ii) a surface of an underlying layer 3 on which the hydrophobic layer is provided. The provision of this degree of roughness (e.g., via nanostructures which define peaks and/or valleys, due to the flame pyrolysis deposition technique) causes the contact angle θ of the coated article to increase and/or be of a relatively high value.

Resulting coated articles according to certain example embodiments of this invention may be used as window units such as automotive windshields, automotive backlites, automotive side windows, snow-mobile windshields, architectural windows, or the like.

The effective contact angle for small droplets of liquid such as water (Atomizer principle) is nearly 180 degrees in air. Certain embodiments of this invention take advantage of this by creating an exterior surface of a coated article that has a degree of surface roughness, thereby creating portions of material as well as portions of air (i.e., voids or gaps) at the surface. Moreover, the roughness has an anticapillary effect. Thus, a greater portion of a liquid drop on the exterior surface of the coated article is exposed to air as opposed to solid matter, thereby increasing the contact angles θ. Combining this surface roughness technique with the use of a hydrophobic layer provided on the rough underlayer permits the resulting coated article to have a high contact angles θ, and have surface hardness and possibly scratch resistant characteristics sufficient such that the article may be used in automotive and other high exposure environments if desired and if certain hydrophobic material(s) are used.

Figure 3:
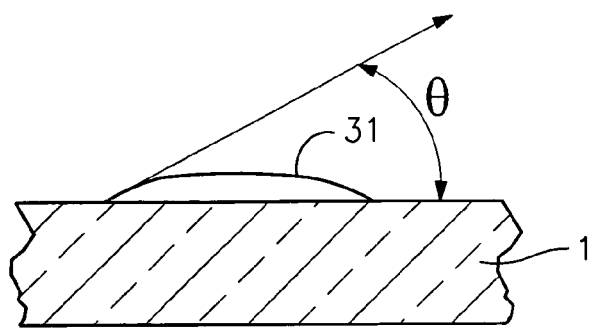
FIG. 3 is a side cross sectional partially schematic view illustrating a contact angle θ of a drop (e.g., sessile drop of water) on an uncoated glass substrate.
Figure 4:
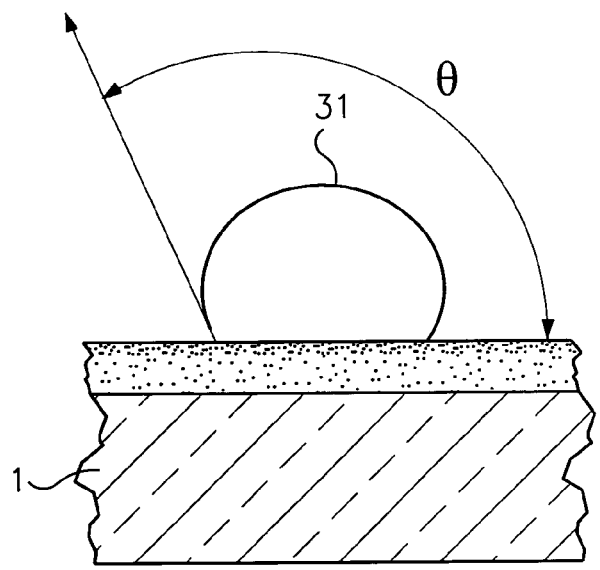
FIG. 4 is a side cross sectional partially schematic view illustrating a high contact angle θ of a drop on a coated article including a hydrophobic coating according to an example embodiment of this invention.
Figure 5:
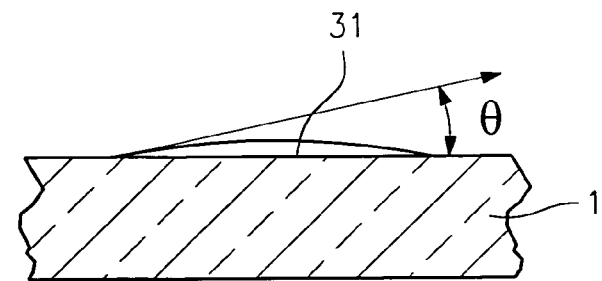
FIG. 5 is a side cross sectional partially schematic view illustrating a low contact angle θ of a drop (e.g., sessile drop of water) on a coated article having a hydrophilic coating.

Hydrophilic performance of the coating is a function of contact angle θ, surface energy γ, and/or wettability or adhesion energy W. The surface energy γ of a layer may be calculated by measuring its contact angles θ. Exemplary contact angles θ are illustrated in FIGS. 3-5. A hydrophilic coating or layer system 1 is on the substrate of FIG. 3 (i.e., low contact angles θ), while no coating of any kind is on the glass substrate of FIG. 4 and a hydrophobic coating (high contact angle) according to certain example embodiments of this invention is on the substrate of FIG. 5. No coatings are illustrated in FIGS. 3 and 5 for purposes of simplicity. To measure contact angle θ in an example embodiment, a sessile drop 31 of a liquid such as water is placed on the substrate (which may be coated) as shown in FIGS. 3-5. A contact angle θ between the drop 31 and underlying article appears, defining an angle θ depending upon the interface tension between the three phases at the point of contact. The contact angle θ is greater in FIG. 5 than in FIG. 4, because the coating on the substrate in FIG. 5 is hydrophobic (i.e., results in a higher contact angle).

As shown in FIG. 2, the exterior surface of flame pyrolysis deposited layer 3 has a degree of roughness as illustrated by the peaks and valleys (i.e., nanostructures) therein. Peaks 7 may be sharp or significantly rounded in different embodiments of this invention, as may valleys 8. The roughness of the exterior surface of layer 3 and/or 5 is defined by the elevations "d" of peaks 7 relative to adjacent valleys 8, and by the gaps "g" between adjacent peaks or adjacent valleys. On the surface of layer 3 and/or 5, the average elevation value "d" in certain embodiments is from about 5-60 nm, more preferably from about 10-50 nm, and most preferably from about 20-35 nm. On the surface of layer 3 and/or 5, the average gap distance "g" between adjacent peaks or adjacent valleys in certain embodiments is from about 10-80 nm, more preferably from about 20-60 nm, and most preferably from about 20-50 nm. The resulting nanomorphology is depicted in FIG. 2 for example. The roughness (i.e., peaks and valleys) may be randomly distributed across the surface of layer 3 and/or layer 5 in certain embodiments, and may be approximately uniformly distributed in other embodiments. Moreover, roughness of these degrees/sizes allows good light transmission through the coated article because the nanostructures (e.g., peaks and valleys) are smaller than certain wavelengths of visible light so that the light is not substantially scattered as it passes therethrough. In certain example embodiments of this invention, the use of surface roughness of layer 3 and/or 5 to enhance hydrophobicity may reduce the need for dopants to be provided in the layer 5 for hydrophobicity purposes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a coated article including a hydrophobic coating, the method comprising:
providing a glass substrate;
using flame pyrolysis to deposit a layer on the glass substrate; and
forming a hydrophobic layer on the substrate over at least the layer deposited by flame pyrolysis,
wherein the flame pyrolysis is performed at atmospheric pressure and the layer deposited by flame pyrolysis has a thickness of at least about 1,000 angstroms, and wherein the layer deposited by flame pyrolysis deposition has a surface roughness such that an average height or elevation "d", where "d" is measured from a bottom of a valley to a top of an adjacent peak, is from about 5 to 60 nm.

2. The method of claim 1, wherein the layer deposited by flame pyrolysis comprises silicon oxide.

3. The method of claim 1, wherein the flame pyrolysis including introducing a gas including oxygen and/or silicon into a flame in order to deposit silicon oxide on the substrate.

4. The method of claim 1, wherein the layer deposited by flame pyrolysis has a surface roughness such that the average height or elevation "d" is from about 10-30 nm.

5. The method of claim 1, wherein the hydrophobic layer comprises a layer including silicon, oxygen and hydrogen.

6. A method of making a coated article including a hydrophobic coating, the method comprising:
providing a glass substrate;
using flame pyrolysis to deposit a layer on the glass substrate, wherein the layer deposited by flame pyrolysis deposition has a surface roughness such that an average height or elevation "d", where "d" is measured from a bottom of a valley to a top of an adjacent peak, is from about 5 to 60 nm;

forming a hydrophobic layer on the substrate over at least the layer deposited by flame pyrolysis, wherein the flame pyrolysis is performed at atmospheric pressure; and wherein the hydrophobic layer is vapor deposited, and further comprises carbon.

7. A method of making a coated article including a hydrophobic coating, the method comprising:

providing a glass substrate;

using flame pyrolysis to deposit a layer on the glass substrate, wherein the layer deposited by flame pyrolysis deposition has a surface roughness such that an average height or elevation "d" where "d" is measured from a bottom of a valley to a top of an adjacent peak is from about 5 to 60 nm;

forming a hydrophobic layer on the substrate over at least the layer deposited by flame pyrolysis, wherein the flame pyrolysis is performed at atmospheric pressure; and wherein the hydrophobic layer comprises a vapor-deposited silane.

8. The method of claim 1, wherein the hydrophobic layer comprises a vapor-deposited dimethyldichlorosilane (DM-DCS).

9. The method of claim 1, wherein the hydrophobic layer has a contact angle θ of at least about 70 degrees.

10. The method of claim 1, wherein the hydrophobic layer has a contact angle θ of at least about 80 degrees.

11. The method of claim 1, wherein the hydrophobic layer has a contact angle θ of at least about 90 degrees.

12. The method of claim 1, wherein the hydrophobic layer has a contact angle θ of at least about 100 degrees.

13. The method of claim 12, wherein the contact angle is an initial contact angle.

14. The method of claim 1, wherein the hydrophobic layer has a tilt angle (30 μL droplet size for reference purposes) of about 30 degrees or less.

15. The method of claim 1, wherein the hydrophobic layer has a thickness less than that of the layer deposited by flame pyrolysis.

16. The method of claim 1, wherein the hydrophobic layer has a thickness of from about 500 to 1,500 Å, and the layer desposited by flame pyrolysis has a thickness of at least about 1,500 Å.

17. The method of claim 1, wherein the layer desposited by flame pyrolysis is a dielectric layer.

18. The method of claim 1, further comprising forming another layer between the glass substrate and the layer deposited by flame pyrolysis.

19. The method of claim 1, wherein the layer deposited by flame pyrolysis comprises $SiO_2$.

20. A method of making a coated article including a hydrophobic coating, the method comprising:

providing a substrate;

using flame pyrolysis to deposit a layer comprising $SiO_2$ on the substrate, wherein the flame pyrolysis comprises introducing a gas and/or liquid comprising Si into a flame of at least one burner in forming the layer comprising $SiO_2$, wherein the layer deposited by flame pyrolysis deposition has a surface roughness such that an average height or elevation "d", where "d" is measured from a bottom of a valley to a top of an adjacent peak, is from about 5 to 60 nm; and forming a hydrophobic layer on the substrate directly on and contacting the layer comprising $SiO_2$ deposited by flame pyrolysis, wherein the flame pyrolysis is performed at atmospheric pressure.

* * * * *